(No Model.)
H. S. DYER & C. R. MONFORT.
FEED BAG FOR ANIMALS.
No. 354,050. Patented Dec. 7, 1886.
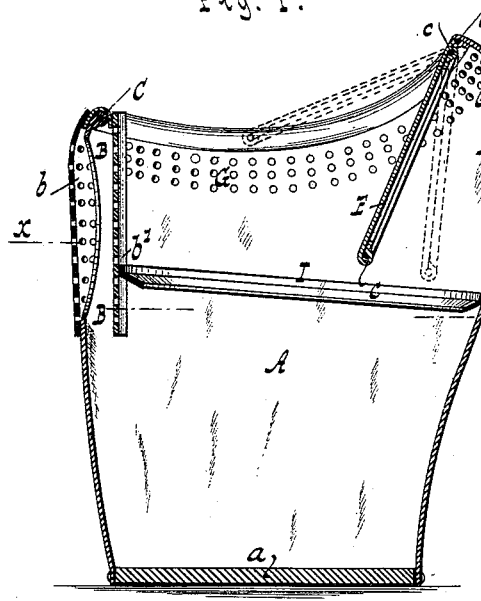
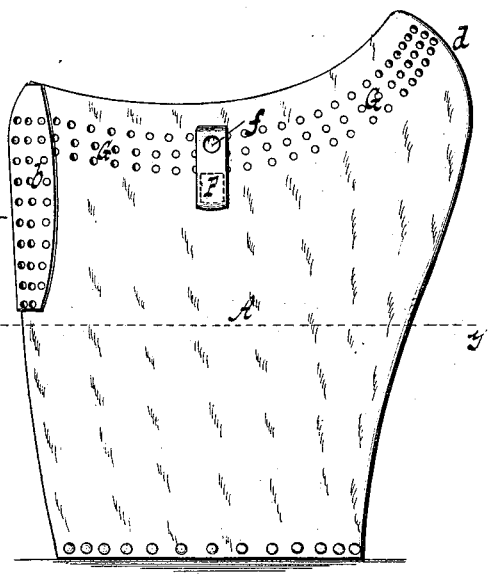
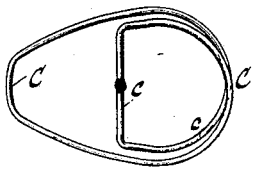
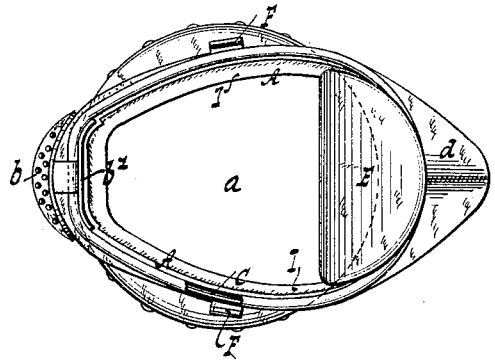
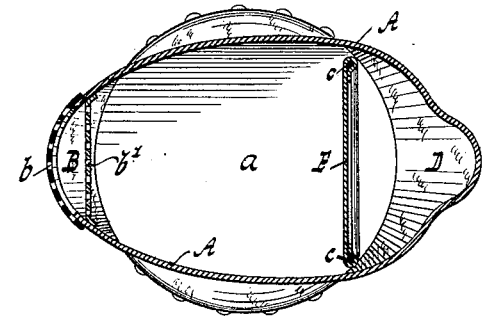
WITNESSES:
INVENTORS
Herbert S. Dyer.
Charles R. Monfort.
BY Van Santvoord & Hauff
his ATTORNEYS

UNITED STATES PATENT OFFICE.

HERBERT S. DYER AND CHARLES R. MONFORT, OF NEW YORK, N. Y.

FEED-BAG FOR ANIMALS.

SPECIFICATION forming part of Letters Patent No. 354,050, dated December 7, 1886.

Application filed September 16, 1886. Serial No. 213,723. (No model.)

*To all whom it may concern:*

Be it known that we, HERBERT S. DYER and CHARLES R. MONFORT, both citizens of the United States, residing at New York, in the county and State of New York, have invented new and useful Improvements in Feed-Bags for Animals, of which the following is a specification.

This invention has for its object to provide a novel, efficient, and durable feed-bag for animals, whereby waste of feed is prevented and free circulation of air admitted.

To such ends the invention consists in the features of construction and combination of devices hereinafter described and claimed, reference being made to the accompanying drawings, in which—

Figure 1 represents a central vertical section of a feed-bag embodying our invention. Fig. 2 is a side elevation of the same. Fig. 3 is a plan or top view. Fig. 4 is a horizontal section in the plane $x\ x$, Fig. 1; and Fig. 5 is a plan view, on a smaller scale, of a detail part.

Similar letters indicate corresponding parts.

In the drawings, the letter A designates the body of the bag, which is made of a suitable material—such as stout canvas. The bottom $a$ consists of a piece of leather, wood, metal, or other suitable material rigid enough to retain its shape and give a proper shape to the lower part of the body.

The upper front portion of the bag contains a vertical flue, B, which is open at its bottom and communicates laterally with the outer air through a perforated plate, $b$, forming one side of said flue. This plate $b$ is made of a stiff material—such as sheet metal—so as to retain its shape. The inner wall of the flue consists of a closing-plate, $b'$, which is secured at its sides and top to the walls of the bag. This plate $b'$ is made of canvas, or other comparatively soft material, so as not to injure the nostrils and surrounding parts of the animal while feeding, and, if desired, it may be perforated, so as to establish a current directly across the flue; but such perforations must be small enough to prevent the feed from being forced through the same. The object of this flue is to provide for a very free circulation of air, it permitting the ingress and egress of air as the animal breathes, while owing to its peculiar construction it prevents the waste of feed.

Horses and other animals in feeding from suspended bags are very apt to throw their heads about and to breathe heavily into the confines of the bag, thereby causing the feed to be thrown over the rim of the bag, and especially over its upper rear surface. To prevent this we give the mouth of the bag a shape to conform to the muzzle and head of the animal, as shown in Figs. 3 and 4. This shape is retained by a stiff wire spring, C, which extends about the mouth of the bag and holds that portion of the same nearly close to the horse's head. In the upper rear portion of the bag is formed a chamber or space, D, the bag being so distended or shaped that an arched or oblique roof, $d$, is formed for said chamber or space. Any feed which is thrown upward into this chamber or space must necessarily return to the bag, and none is wasted. To close the bag against the back portion of the horse's muzzle or head, and prevent the escape of feed between the same and the rim of the bag, we provide a guard-plate, E, which can be hinged to the rim.

In the example shown in the drawings the ends of the wire spring C are prolonged (see Fig. 5) to form a flexible frame, $c$, to which is secured a piece of canvas, or other soft material which will not injure the animal. Normally the guard-plate is held by the spring C in substantially a horizontal plane, as shown by the upper dotted lines in Fig. 1, from which position it yields downwardly as the animal introduces its head—as, for instance, to the full lines or lower dotted lines in Fig. 1—and the tendency of the spring keeps it continually pressed against the muzzle of the animal, at the same time allowing it to yield with the motion of its jaws and head. When the animal removes its head, the guard-plate is returned to its upper or normal position. This guard-plate, when depressed, forms one side of the space or chamber D.

A series of perforations, G, Figs. 1 and 2, is formed in the upper portion of the body A, and such series extends completely around said body, with the exception of that portion containing the metallic flue-plate $b$. These perforations provide for an ample circulation of air about the horse's head.

The flaps or side straps, F, Figs. 2 and 3, for attaching the feed-bag to the suspending strap or rope which extends over the horse's head, consist each of a piece of such material as leather, which may be of double thickness, and has therein an eye, *f*, Fig. 2, for suspension. These flaps or side straps are secured to the outside of the bag instead of inside, as usual, so that the weight of the bag and its contents causes the rim of the bag to be forced inward at and around the cheek portion of the animal.

To attach our improvements to ordinary feed-bags, a section containing the same can be made—for instance, a section extending to the line marked *y y*, Fig. 2—which section can be sewed or otherwise secured to the usual feed-bag.

In order to prevent the waste of feed in case the bag loses its shape by rough handling to which it may be subjected, we provide an additional guard, I, which consists of a strip of leather, canvas, or other suitable material that is secured in the interior of the bag. This guard, which we shall term the "guard-ring," can yield as the animal introduces or removes its head, and while it is feeding said guard-ring fits snugly about the muzzle of such animal, thereby preventing the feed from being thrown out.

What we claim as new, and desire to secure by Letters Patent, is—

1. The combination, with a feed-bag having perforations at the top portion of its front, of a vertical partition, *b'*, secured at its sides and top to the bag, and separated from the front part of the bag to provide the intervening vertical flue B, open at its bottom and in communication with the external atmosphere through the said perforated part of the bag, substantially as and for the purpose described.

2. The combination, with a feed-bag having its front top part provided with an attached perforated stiff plate, *b*, of a vertical partition, *b'*, connected with the bag, and separated from the perforated plate to provide the intervening vertical flue B, open at its bottom and in communication with the external atmosphere through the said perforated stiff plate, substantially as and for the purposes described.

3. The combination, with a feed-bag, of a swinging guard-plate, E, and a spring acting to normally hold the plate approximately horizontal in the mouth of the bag, but permitting the said plate to be swung downward within the bag by the introduction of an animal's head thereinto, and thereby place the spring under tension, substantially as and for the purpose described.

4. The combination, with a feed-bag, of a spring, C, secured around the bag-mouth, and a swinging guard-plate secured at its upper edge to the spring, said spring serving to preserve the shape of the bag-mouth, and to normally swing the guard-plate upward and hold it approximately horizontal in the bag-mouth, but permitting the plate to be swung downward within the bag by the introduction of an animal's head thereinto, substantially as and for the purpose described.

5. The combination, with a feed-bag having an arched roof, *d*, above the chamber, of a swinging guard-plate, E, constituting, when swung inward, a wall to provide a chamber, D, and a spring acting to normally swing the plate upward and hold it approximately horizontal in the bag-mouth, substantially as and for the purpose described.

6. The combination, with a feed-bag, of a spring-wire, C, secured around the bag-mouth, and extended at its rear into a flexible frame, *c*, and the guard-plate E, secured at its upper edge to said flexible frame, and thereby normally held approximately horizontal in the bag-mouth, but permitting said plate to swing downward within the bag by the introduction of an animal's head thereinto, substantially as and for the purpose described.

7. A feed-bag having the yielding spring-pressed guard-plate E at the rear, and provided with the vertical front flue, B, open at its bottom, and composed of the rear partition, *b'*, and front perforated plate, *b*, through which latter the flue is placed in communication with the external atmosphere, substantially as and for the purpose described.

8. A feed-bag having the yielding spring-pressed guard-plate E at its rear, and provided with the yielding guard-ring I, extending around the bag below the guard-plate, and the front vertical flue, B, open at its lower end below the guard-ring, and composed of the rear plate, *b'*, and the front perforated plate, *b*, through which latter the flue is placed in communication with the external atmosphere, substantially as and for the purposes described.

In testimony whereof we have hereunto set our hands and seals in the presence of two subscribing witnesses.

HERBERT S. DYER.  [L. S.]
 CHARLES R. MONFORT.  [L. S.]

Witnesses:
 A. FABER DU FAUR, Jr.,
 E. F. KASTENHUBER.